No. 772,274. PATENTED OCT. 11, 1904.
C. H. DAY.
TRANSMISSION GEAR.
APPLICATION FILED OCT. 16, 1903.
NO MODEL. 2 SHEETS—SHEET 1.
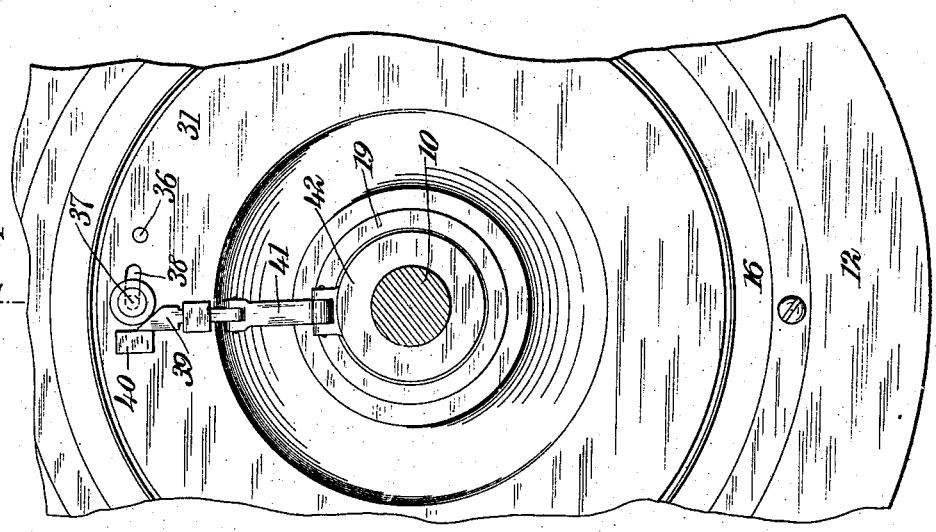
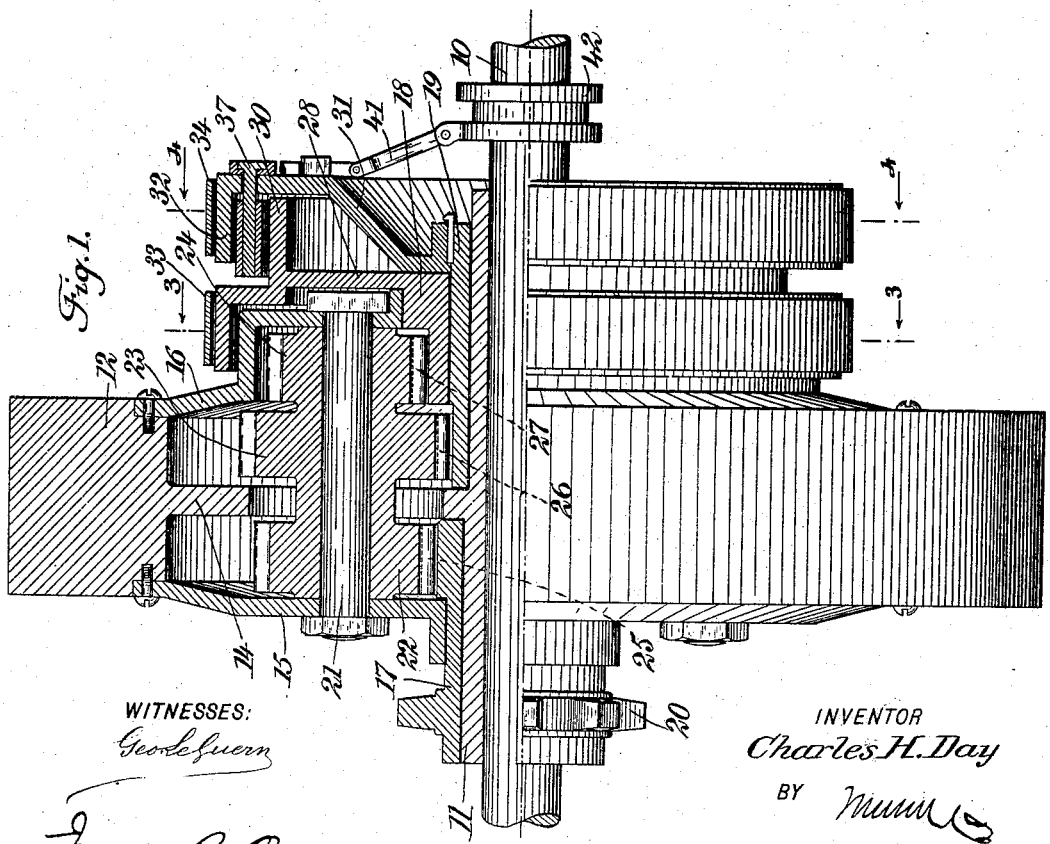
WITNESSES:
INVENTOR
Charles H. Day
BY
ATTORNEYS No. 772,274. PATENTED OCT. 11, 1904.
C. H. DAY.
TRANSMISSION GEAR.
APPLICATION FILED OCT. 16, 1903.
NO MODEL. 2 SHEETS—SHEET 2.
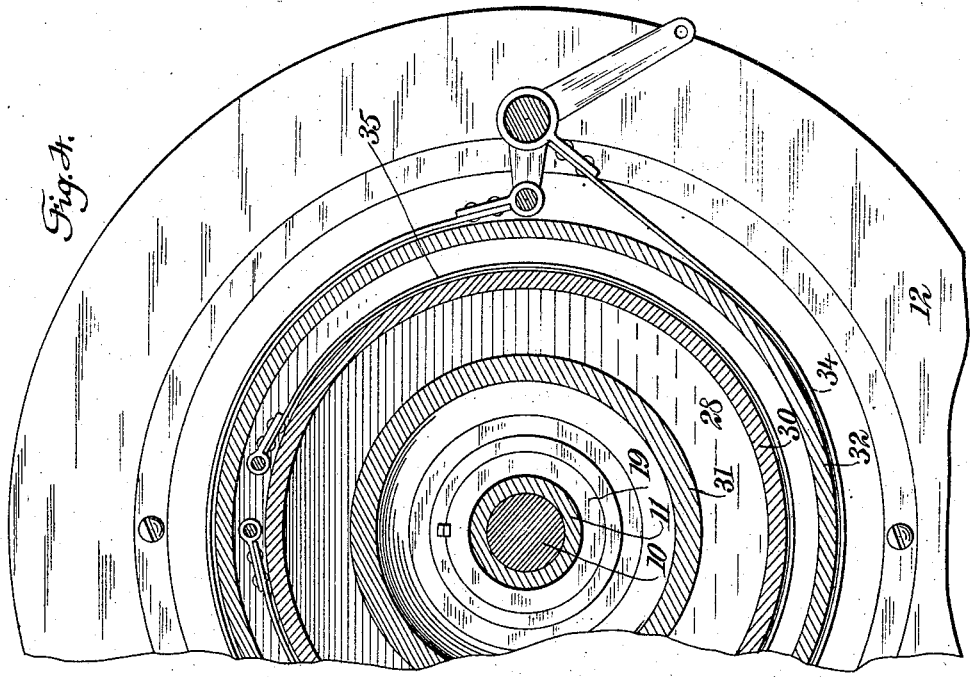
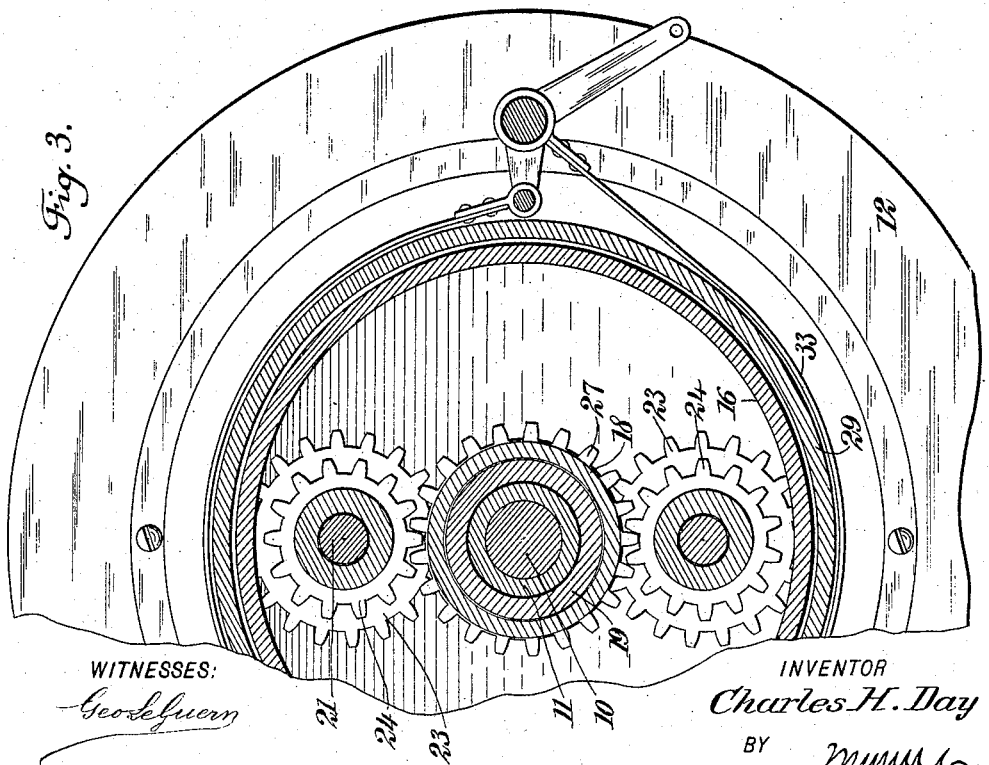
WITNESSES:
Geo Lefuern
Isaac B. Owens
INVENTOR
Charles H. Day
BY
Munn & Co
ATTORNEYS No. 772,274. Patented October 11, 1904.

UNITED STATES PATENT OFFICE.

CHARLES HEALY DAY, OF HORNELLSVILLE, NEW YORK.

TRANSMISSION-GEAR.

SPECIFICATION forming part of Letters Patent No. 772,274, dated October 11, 1904.

Application filed October 16, 1903. Serial No. 177,275. (No model.)

*To all whom it may concern:*

Be it known that I, CHARLES HEALY DAY, a citizen of the United States, and a resident of Hornellsville, in the county of Steuben and State of New York, have invented a new and Improved Transmission-Gear, of which the following is a full, clear, and exact description.

This invention relates to a mechanism for transmitting movement in opposite directions and at varying speeds. It is designed especially for application to the internal-combustion engines of automobiles and the like; but it is clear that it may be used in many other connections.

The mechanism consists of a gearing of the sun-and-planet type, whose principal feature lies in the arrangement by which the planetary gears are carried bodily by the driving member and moved continuously around the axis thereof, high speed being attained by locking the gearing and low speed and reverse being attained by coacting gears of varying ratio, as will be hereinafter fully set forth.

The invention involves various other features of major or minor importance.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a longitudinal section of the gear. Fig. 2 is a partial right-side elevation thereof. Fig. 3 is a sectional elevation on the line 3 3 of Fig. 1, and Fig. 4 is a sectional elevation on the line 4 4 of Fig. 1.

According to the embodiment of my invention shown in the accompanying drawings, 10 indicates the engine-shaft, to which is keyed or otherwise fastened the elongated hub 11 of the fly-wheel 12, 14 indicating the orificed web of the fly-wheel. Cheek-plates 15 and 16 are fastened to the sides of the rim of the fly-wheel, so as to form practically a part thereof, and the cheek-plate 15 loosely encircles the driven sleeve 17, while the cheek-plate 16 loosely encircles a sleeve 18, in turn carried loosely on a sleeve 19, and both of said sleeves 18 and 19 being mounted concentrically on the right-hand end of the hub 11 of the fly-wheel. The driven sleeve 17 is mounted loosely on the left-hand end of the fly-wheel hub and carries a sprocket-wheel 20 or other gear element.

The cheek-plates 15 and 16 carry one or more journals 21, and each journal carries three connected planetary gears 22, 23, and 24, which gears are respectively in mesh with gears 25, 26, and 27. The gear 25 is fast on the sleeve 17, the gear 26 is fast on the sleeve 19, and the gear 27 is fast on the sleeve 18. The driven gear 25 is of diameter intermediate the diameters of the gears 26 and 27 for a purpose which will hereinafter appear.

The sleeve 18 has fastened to or formed integral therewith a web 28, this web carrying flanges 29 and 30, and the sleeve 19 has a web 31 fastened to or formed integral therewith, the latter web carrying a brake-flange 32. Coacting with the flanges 29 and 32 are any suitable brake devices 33 and 34, respectively, said brake devices serving to permit holding either the flange 29 or the flange 32, and consequently the gear 27 or the gear 26, stationary, as may be desired. Coacting with the parts 28, 30, and 31 is a clutch device of any suitable form, which enables said parts, and consequently the sleeves 18 and 19 and the gears 26 and 27, to be locked together. According to the arrangement here shown the clutch device comprises a strap 35, fastened at one end to the web 31, as indicated at 36 in Fig. 2. This strap encircles the flange 30 of the web 28, and the other end of the strap has a pin 37 attached thereto, which pin is movable freely in a slot 38, formed in the web 31. A wedge 39 acts between the outer end of the pin 37 and a stop 40 on the web 31, and by forcing the wedge between these parts 37 and 40 the strap 35 is tightened on the flange 30, and since said strap is in connection with the web 31 the parts 28 and 31 are therefore locked together. The wedge 39 may be actuated by a link 41, connected to the wedge and to a collar 42, mounted loosely on the drive-shaft 10.

In the operation of the apparatus to attain high speed—that is to say, a speed equal to that of the revolution of the shaft 10—the clutch-strap 35 should be tightened around the flange 30, thus holding the parts 28, 31, 18, 19, 27, and 26 stationary with respect to each other. This will lock the entire gearing and movement will be transmitted directly to the sleeve 17. To attain low speed, the brake-strap 34 should be tightened on the flange 32, and this brake-strap being connected to a support independent of the transmission-gear the parts 32, 31, 19, and 26 will be held stationary. The planetary gears moving bodily around with the driving-shaft will simultaneously roll around the gear 26, this independent rolling movement being of a speed controlled by the ratio of the gears 23 and 26, and owing to the difference between the ratio of these gears and the gears 22 and 25 the latter gear, with the elements 17 and 20, will be driven in the same direction that the shaft 10 is turning, but at a slower speed. To reverse the movement of the driven element 17, the braking device 34 should be relaxed and the braking device 33 applied to the flange 29, thus holding stationary the parts 29, 28, 18, and 27. The planetary gears moving bodily around the stationary gears 27 will be given independent rotating movement, the speed of which is dependent upon the ratio of the gears 24 and 27, and owing to the difference between the ratio of these gears and the gears 22 and 25 the gear 25 will be driven reversely to the movement of the shaft 10 and at a slower speed. The exact ratio of the gears is immaterial and may be varied at will, so as to regulate the slow speed and reverse with respect to the high speed. It will also be observed that a plurality of slow speeds or reverses may be attained by increasing the sets of gears 23 and 26 and 24 and 27.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of a rotary driving member, three connected gears of different diameters carried to move bodily with the driving member and capable of rotation independently thereof, a driven gear meshed with one of the planetary gears, two additional gears meshed respectively with the two remaining planetary gears, means for arresting the movement of either of the said additional gears, and means for locking said two additional gears together stationary with respect to each other, for the purpose specified.

2. The combination of a rotating driving member, three connected planetary gears of different diameters mounted on the driving member to move bodily therewith and also capable of independent rotating movement, a driven gear meshed with one of the planetary gears, two additional gears respectively meshed with the two remaining planetary gears, a brake-drum in connection with each of the said additional gears, a brake device coacting with each drum, and means for fastening both of said drums together, for the purpose specified.

3. The combination of a rotating driving member, three connected planetary gears of different diameters mounted on the driving member to move bodily therewith and also capable of independent rotating movement, a driven gear meshed with one of the planetary gears, two additional gears respectively meshed with the two remaining planetary gears, a brake-drum in connection with each of the said additional gears, a brake device coacting with such drum, one of said drums having a concentrically-disposed overhanging portion, and a clutch device connected with the other drum and adapted to be engaged with the said overhanging portion to lock the two drums together, for the purpose specified.

4. The combination of a rotary driving member, three connected planetary gears mounted on the driving member to move bodily therewith and capable of independent rotation, a driven gear meshed with one of said planetary gears, two additional gears respectively meshed with the other planetary gears, means for independently retarding the movement of said additional gears, and means for locking said additional gears directly together.

5. The combination of a rotary driving member, three connected planetary gears mounted on the driving member to move bodily therewith and capable of independent rotation, a driven gear meshed with one of the planetary gears, two concentric, independently-revoluble sleeves loosely mounted on the driving member, two additional gears carried respectively by said sleeves and meshed with the two remaining planetary gears, means for independently retarding the movement of said sleeves, and means for locking the sleeves and consequently the said additional gears directly together.

6. The combination of a rotary driving-shaft, a fly-wheel attached thereto, three connected planetary gears carried by the fly-wheel and capable of independent rotation, a driven gear meshed with one of the planetary gears, two sleeves loosely fitted one within the other and mounted loosely on the driving-shaft, two additional gears respectively on the sleeves and meshed with the two remaining planetary gears, the sleeves projecting beyond one side of the fly-wheel, a web carried by the projected portion of each sleeve, means acting with the webs and capable of independently retarding the rotation of the sleeves and their attached gears, and means for directly locking said webs and their connected parts together.

7. The combination of a rotary driving-shaft, three connected planetary gears carried thereby and capable of independent rotation, a driven gear meshed with one of the planetary gears, two sleeves fitted loosely one within the other and loosely on the driving-shaft, two additional gears respectively carried by the sleeves and respectively meshed with the remaining planetary gears, two flanged webs forming brake-drums respectively connected with the sleeves and lying at one side of the planetary gears, braking devices coacting with said brake-drums, and a clutch mounted on one drum and adapted to engage a part of the other to lock said drums directly together, for the purpose specified.

8. The combination of a rotary driving-shaft, three connected planetary gears carried by the shaft and capable of independent rotation, a driven gear meshed with one of the planetary gears, two sleeves fitted loosely one within the other and loosely on the driving-shaft, two additional gears respectively carried by the sleeves and respectively meshed with the two remaining planetary gears, a web attached to each sleeve at one side of the planetary gears, said webs having flanges and constituting brake-drums, brake devices coacting therewith, an additional flange connected to one web and projecting toward the other, and a clutch device encircling said additional flange and mounted on the said other web, for the purpose specified.

In testimony whereof I have signed my name to this specification in the presence of two subscribing witnesses.

CHARLES HEALY DAY.

Witnesses:
  E. P. HACKETT,
  C. H. NEEL.